US006862629B1

(12) United States Patent
Hericourt

(10) Patent No.: US 6,862,629 B1
(45) Date of Patent: Mar. 1, 2005

(54) METHOD AND SYSTEM FOR DISPATCHING SOCKS TRAFFIC BASED ON SOCKS CONNECTION IDENTIFIED BY SOURCE ADDRESS, APPLICATION ADDRESS AND APPLICATION LEVEL PROTOCOL

(75) Inventor: Olivier Hericourt, Cagnes-sur-Mer (FR)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 09/676,738

(22) Filed: Sep. 29, 2000

(30) Foreign Application Priority Data

Oct. 21, 1999 (EP) .......................... 99480103

(51) Int. Cl.[7] .......................... G06F 15/173
(52) U.S. Cl. .................. 709/238; 709/224; 709/240; 709/242
(58) Field of Search .............. 709/223–225, 709/227–232, 234–236, 235–242; 370/229–230

(56) References Cited

U.S. PATENT DOCUMENTS

| | | | | | |
|---|---|---|---|---|---|
| 5,396,630 | A | * | 3/1995 | Banda et al. ............... | 719/316 |
| 5,828,653 | A | * | 10/1998 | Goss ........................ | 370/230 |
| 5,991,807 | A | * | 11/1999 | Schmidt et al. ............. | 709/225 |
| 6,195,366 | B1 | * | 2/2001 | Kayashima et al. ......... | 370/475 |
| 6,219,706 | B1 | * | 4/2001 | Fan et al. .................... | 709/225 |
| 6,405,256 | B1 | * | 6/2002 | Lin et al. .................... | 709/231 |
| 6,515,963 | B1 | * | 2/2003 | Bechtolsheim et al. ..... | 370/229 |

OTHER PUBLICATIONS

Goldszmidt et al.; NetDispatcher: A TCP Connection Router; May 19th, 1997; IBM Research Report.*
Stevens, W. R.; TCP/IP Illustrated: The Protocols; 1994; Addison Wesley; vol. I; pp. 10, 12–13, 34–37, and 225–226.*
Hunt et. al; Network Dispatcher: A Connection Router for Scalable Internet Services; Apr. 1998; In Proceedings of the 7th International World Wide Web Conference (WWW7).*

Leech et al.; SOCKS Protocol Version 5; Mar. 1996.*

* cited by examiner

Primary Examiner—Le Hien Luu
Assistant Examiner—Quang N. Nguyen
(74) Attorney, Agent, or Firm—Daniel E. McConnell; John R. Pivnichny; Dillon & Yudell LLP

(57) ABSTRACT

The present invention relates to a method and system for dispatching on a socks server an IP datagram originated from an application on a source device, in an Internet Protocol (IP) network comprising a plurality of socks servers, said IP datagram comprising a Source IP Address field in the IP header, a Source Port field in the Transmission Control Protocol (TCP) header, and socks data. The method comprises, in a socks dispatcher, the steps of:

identifying the source device by retrieving source address in the Source IP Address field;
  identifying the application on the source device by retrieving the application address in the Source Port field;
  determining the application level protocol of socks data referring to a first table, the first table comprising for each socks connection identified by a source address and an application address, an application level protocol; and
  selecting a socks server referring to a second table, the second table defining for each application level protocol one or a plurality of socks servers.

The step of selecting a socks server referring to a second table, comprises the further steps of:

determining the number of socks servers in the second table defined for the application level protocol of the IP datagram:
  if only one socks server is defined in the second table, forwarding the IP datagram to said socks server,
  if more that one socks server is defined in the second table, forwarding the IP datagram to a socks server selected according to its capacity and the priority of the IP datagram.

11 Claims, 10 Drawing Sheets

General Physical View of an End User Accessing the World-Wide-Web

View of an End User Accessing the Web through a Socks Server

Socks Priority Finder

METHOD AND SYSTEM FOR DISPATCHING SOCKS TRAFFIC BASED ON SOCKS CONNECTION IDENTIFIED BY SOURCE ADDRESS, APPLICATION ADDRESS AND APPLICATION LEVEL PROTOCOL

BACKGROUND OF THE INVENTION

1. Technical Field

The present invention relates to computer networks, and more particularly to a method and system in an IP network for optimally dispatching IP datagrams comprising socks traffic among a plurality of Socks Servers.

2. Description of the Related Art

Internet

The Internet is a global network of computers and computers networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet:

- transmitting and receiving electronic mail,
- logging into remote computers (the "Telnet"), and
- transferring files and programs from one computer to another ("FTP" or "File Transfer Protocol").

TCP/IP

The TCP/IP protocol suite is named for two of the most important protocols:

- a Transmission Control Protocol (TCP), and
- an Internet Protocol (IP).

Another name for it is the Internet Protocol Suite. The more common term TCP/IP is used to refer to the entire protocol suite. The first design goal of TCP/IP is to build an interconnection of networks that provide universal communication services: an internetwork, or internet. Each physical network has its own technology dependent communication interface, in the form of a programming interface that provides basic communication functions running between the physical network and the user applications. The architecture of the physical networks is hidden from the user. The second goal of TCP/IP is to interconnect different physical networks to form what appears to the user to be one large network.

TCP is a transport layer protocol providing end to end data transfer. It is responsible for providing a reliable exchange of information between 2 computer systems. Multiple applications can be supported simultaneously over one TCP connection between two computer systems.

IP is an internetwork layer protocol hiding the physical network architecture below it. Part of the communicating messages between computers is a routing function that ensures that messages will be correctly directed within the network to be delivered to their destination. IP provides this routing function. An IP message is called an IP Datagram.

Application Level protocols are used on top of TCP/IP to transfer user and application data from one origin computer system to one destination computer system. Such Application Level protocols are for instance File Transfer Protocol (FTP), Telnet, Gopher, Hyper Text Transfer Protocol (HTTP).

IP Router

A router interconnects networks at the internetwork layer level (IP) and routes messages between them. Routers are able to select the best transmission path between networks. The basic routing function is implemented in the IP layer of the TCP/IP protocol stack, so any host (or computer) or workstation running TCP/IP over more than one interface could, in theory, forward the messages between networks. However, dedicated network hardware devices called "Routers" provide more sophisticated routing functions than the minimum functions implemented in IP. Because IP implements the basic routing functions, the term "IP Router" is often used.

World Wide Web

With the increasing size and complexity of the Internet, tools have been developed to help find information on the network, often called navigators or navigating systems. Navigation systems that have been developed include standards such as Archie, Gopher and WAIS. The World Wide Web ("WWW" or "the Web") is a recent superior navigation system. The Web is:

- an Internet-based navigation system,
- an information distribution and management system for the Internet, and
- a dynamic format for communicating on the Internet.

The Web seamlessly, for the use, integrates format of information, including still images, text, audio and video. A user on the Web using a graphical user interface ("GUI", pronounced "gooey") may transparently communicate with different host computers on the system, and different system applications (including FTP and Telnet), and different information formats for files and documents including, for example, text, sound and graphics.

Hypermedia

The Web uses hypertext and hypermedia. Hypertext is a subset of hypermedia and refers to computer-based "documents" in which readers move from one place to another in a document, or to another document, in a non-linear manner. To do this, the Web uses a client-server architecture. The Web servers enable the user to access hypertext and hypermedia information through the Web and the user's computer. (The user's computer is referred to as a client computer of the Web Server computers.) The clients send requests to the Web Servers, which react, search and respond. The Web allows client application software to request and receive hypermedia documents (including formatted text, audio, video and graphics) with hypertext link capabilities to other hypermedia documents, from a Web file server.

The Web, then, can be viewed as a collection of document files residing on Web host computers that are interconnected by hyperlinks using networking protocols, forming a virtual "web" that spans the Internet.

Uniform Resource Locators

A resource of the Internet is unambiguously identified by a Uniform Resource Locator (URL), which is a pointer to a particular resource at a particular location. A URL specifies the protocol used to access a server (e.g. HTTP, FTP, . . . ), the name of the server, and the location of a file on that server.

Hyper Text Transfer Protocol

Each Web page that appears on client monitors of the Web may appear as a complex document that integrates, for example, text, images, sounds and animation. Each such page may also contain hyperlinks to other Web documents so that a user at a client computer using a mouse may click on icons and may activate hyperlink jumps to a new page (which is a graphical representation of another document file) on the same or a different Web server.

A Web server is a software program on a Web host computer that answers requests from Web clients, typically over the Internet. All Web use a language or protocol to communicate with Web clients which is called Hyper Text Transfer Protocol ("HTTP"). All types of data can be exchanged among Web servers and clients using this protocol, including Hyper Text Markup Language ("HTML"), graphics, sound and video. HTML describes the layout, contents and hyperlinks of the documents and pages. Web clients when browsing:

- convert user specified commands into HTTP GET requests,
- connect to the appropriate Web server to get information, and
- wait for a response. The response from the server can be the requested document or an error message.

After the document or an error message is returned, the connection between the Web client and the Web server is closed.

First version of HTTP is a stateless protocol. That is with HTTP, there is no continuous connection between each client and each server. The Web client using HTTP receives a response as HTML data or other data. This description applies to version 1.0 of HTTP protocol, while the new version 1.1 break this barrier of stateless protocol by keeping the connection between the server and client alive under certain conditions.

Browser

After receipt, the Web client formats and presents the data or activates an ancillary application such a sound player to present the data. To do this, the server or the client determines the various types of data received. The Web Client is also referred to as the Web Browser, since it in fact browses documents retrieved from the Web Server.

Domain Names

The host or computers names (like www.entreprise.com) are translated into numeric Internet addresses (like 194.56.78.3), and vice versa, by using a method called DNS ("Domain Name Service"). DNS is supported by network-resident servers, also known as domain name servers or DNS servers.

Intranet

Some companies use the same mechanism as the Web to communicate inside their own corporation. In this case, this mechanism is called an "Intranet". These companies use the same networking/transport protocols and locally based Web servers to provide access to vast amount of corporate information in a cohesive fashion. As this data may be private to the corporation, and because the members of the company still need to have access to public Web information, to avoid that people not belonging to the company can access to this private Intranet coming from the public Internet, they protect the access to their network by using a special equipment called a Firewall.

Firewall

A Firewall protects one or more computers with Internet connections from access by external computers connected to the Internet. A Firewall is a network configuration, usually created by hardware and software, that forms a boundary between networked computers within the Firewall from those outside the Firewall. The computers within the Firewall form a secure sub-network with internal access capabilities and shared resources not available from the outside computers.

Often, a single machine, on which the Firewall is, allows access to both internal and external computers. Since the computer, on which the Firewall is, directly interacts with the Internet, strict security measures against unwanted access from external computers are required.

A Firewall is commonly used to protect information such as electronic mail and data files within a physical building or organization site. A Firewall reduces the risk of intrusion by unauthorized people from the Internet, however, the same security measures can limit or require special software for those inside the Firewall who wish to access information on the outside. A Firewall can be configured using "Proxies" or "Socks" to designate access to information from each side of the Firewall.

Proxy Server

A HTTP Proxy is a special server that typically runs in conjunction with Firewall software and allows an access to the Internet from within a Firewall. The Proxy Server:

- waits for a request (for example a HTTP request) from inside the Firewall,
- forwards the request to the remote server outside the Firewall,
- reads the response, and sends the response back to the client.

A single computer can run multiple servers, each server connection identified with a port number. A Proxy server, like an HTTP Server or a FTP Server, occupies a port. Typically, a connection uses standardized port numbers for each protocol (for example, HTTP=80 and FTP=21). That is why an end user has to select a specific port number for each defined Proxy Server. Web Browsers usually let the end user set the host name and port number of the Proxy Servers in a customizable panel. Protocols such as HTTP, FTP, Gopher, WAIS, and Security can usually have designated Proxies. Proxies are generally preferred over Socks for their ability to perform caching, high-level logging, and access control, because they provide a specific connection for each network service protocol.

Socks and Socks Server

Socks is a protocol which does some form of encapsulation of Application Level protocols (for instance FTP, Telnet, Gopher, HTTP). Using Socks, the Application Level traffic between a system running a Socks Client software and a system running a Socks Server software is encapsulated in a virtual Socks tunnel between both systems. Socks is mainly used by systems within an Intranet in order to gain a secure access to systems located outside the Intranet.

A Socks Server acts as a relay between the systems within the Intranet and the systems outside the Intranet, thus hiding the internal systems from the external Internet. It is considered as one form of Firewall.

A Socks Server (also called Socks Gateway) is a software that allows computers inside a Firewall to gain access to the Internet. A Socks Server is usually installed on a server positioned either inside or on the Firewall. Computers within the Firewall access the Socks Server as Socks Clients to reach the Internet. Web Browsers usually let the end user set the host name and port number of the Socks Servers in a customizable panel. On some Operating Systems, the Socks Server is specified in a separate file (e.g. socks.conf file). As the Socks Server acts a layer underneath the protocols (HTTP, FTP, . . . ), it cannot cache data (as Proxy does), because it doesn't decode the protocol to know what kind of data it transfers.

Dispatcher System

When multiple Firewalls are used to gain access to systems outside the Intranet, a dedicated device called "Dispatcher System" is often used within the Intranet for dispatching the traffic to these multiple Firewalls. The main goal of the Dispatcher System is to balance the load across the multiple Firewalls. For instance when a very powerful Firewall and a smaller Firewall are available, more traffic should be dispatched on the very powerful Firewall than on the smaller one. Such Dispatcher Systems are either dedicated hardware devices, or software components installed on existing network device (such as an IP Router).

More explanations about the technical field presented in the above sections can be found in the following publications incorporated herewith by reference:

TCP/IP Tutorial and Technical Overview" by Martin W. Murhammer, Orcun Atakan, Stefan Bretz, Larry R. Pugh, Kazunari Suzuki, David H. Wood, International Technical Support Organization, October 1998, GG24-3376-05.

"Java Network Programming by Elliotte Rusty Harold, published by O'Reilly, February 1997.

Internet in a Nutshell" by Valerie Quercia, published by O'Reilly, October 1997.

Building Internet Firewalls" by Brent Chapman and Elizabeth Zwichky, published by O'Reilly, September 1995.

Problem

The problem to solve is to provide an optimized system and method for dispatching Socks traffic within a TCP/IP network. By nature, the Socks protocol is a form of encapsulation of Application Level traffic such as HTTP, FTP, Telnet. When Socks Servers are used within an Intranet to provide secure access to systems located outside the Intranet, IP routers and network devices within this Intranet only see and handle Socks traffic. As a consequence, all Application Level protocols encapsulated by Socks are treated alike within the TCP/IP network.

When multiple Socks Servers are used within the Intranet to access systems outside the Intranet, a dedicated device called "Dispatcher System" is often used for dispatching the traffic on these multiple Socks Servers. The purpose of such Dispatcher System is mainly to balance the load across the multiple Socks Servers. For instance when a very powerful Socks Server and a smaller Socks Servers are available, more traffic can be dispatched on the very powerful Socks Server than on the smaller one.

In a Socks environment, the problem is that Dispatcher System usually only sees and process Socks traffic and does not see the Application Level traffic which is encapsulated by Socks. As a consequence, all Application Level protocols such as HTTP, FTP, Telnet, are then treated alike by the Dispatcher System. There is no differentiation between the Application Level connections. For instance, an interactive Telnet traffic is processed with the same priority than a batch FTP traffic. The Telnet traffic should be dispatched on a very powerful Socks Server while the FTP traffic should be dispatched on a smaller Socks Server.

The current solutions address this problem partially:

The dispatching of Socks traffic can be done based on the IP address of the origin computer system or/and based on the IP address of the destination computer system. The main drawbacks of this solution are:

For a given origin or destination system, Socks traffic is always processed the same way. IP Routers and Dispatcher Systems only see always the same Socks traffic without differentiating the Application Level protocols. For instance, an interactive Telnet connection and a batch FTP connection from the same origin will be handled with the same priority. Thus, the high priority interactive Telnet connection may be slowed down by the low priority batch connection.

All Socks Servers handle indifferently all Application Level protocols since a Socks Server cannot be selected by the Dispatcher System according to the Application Level protocol criteria. For instance, it is not possible to have a high capacity Socks Server handling all Application Level protocols and another Socks Server with lower capacity only handling FTP traffic because the Dispatcher System has not the knowledge of the Application Level protocol (HTTP, FTP, . . . ) encapsulated in the Socks traffic.

The dispatching of Socks traffic can be done according to the Type Of Service (TOS) field comprised in the IP Datagram Header. The main drawbacks of this solution are:

The TOS field must be set in the Datagrams that the Dispatcher System receives:

either by the origin workstation system (the system which creates the IP Datagram with the TOS field), or by some network devices within the Intranet (for instance an IP Router which has the possibility of altering the TOS field of the IP Datagram it routes).

In an Intranet where the TOS field cannot be set nor used, the dispatching of Socks traffic cannot be based on the value of the TOS field.

The TOS field of IP Datagrams set by some workstations or devices within the Intranet may be used for other purposes and may not reflect the actual priority and Application Level protocol of the IP Datagrams.

3. Objects of the Invention

An object of the present invention is to dispatch Socks traffic among a plurality of Socks Servers according to some Application Level protocol and priority criteria.

It is a further object of the present invention to optimize the performance of WEB access via Socks Servers, by integrating Application Level protocol and priority factors to the Socks Server selection.

It is another object of the present invention to minimize the interruption of WEB access via Socks Servers and to insure a better WEB access availability, by dropping low priority traffic in case of congestion.

SUMMARY OF THE INVENTION

The present invention relates to a method and system for dispatching on a socks server an IP datagram originated from an application on a source device, in an Internet Protocol (IP) network comprising a plurality of socks servers, said IP datagram comprising a Source IP Address field in the IP header, a Source Port field in the Transmission Control Protocol (TCP) header, and socks data. The method comprises, in a socks dispatcher, the steps of:

identifying the source device, said step comprising the further step of:

retrieving source address in the Source IP Address field, identifying the application on the source device, said step comprising the further step of:

retrieving the application address in the Source Port field, determining the application level protocol of socks data referring to a first table, the first table comprising for each socks connection identified by a source address and an application address, an application level protocol.

selecting a socks server referring to a second table, the second table defining for each application level protocol one or a plurality of socks servers.

The step of selecting a socks server referring to a second table, comprises the further steps of:

determining the number of socks servers in the second table defined for the application level protocol of the IP datagram:
if only one socks server is defined in the second table, forwarding the IP datagram to said socks server,
if more that one socks server is defined in the second table, forwarding the IP datagram to a socks server selected according to its capacity and the priority of the IP datagram.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION ACCESS TO THE WORLD WIDE WEB

Logical View

Figure 1:
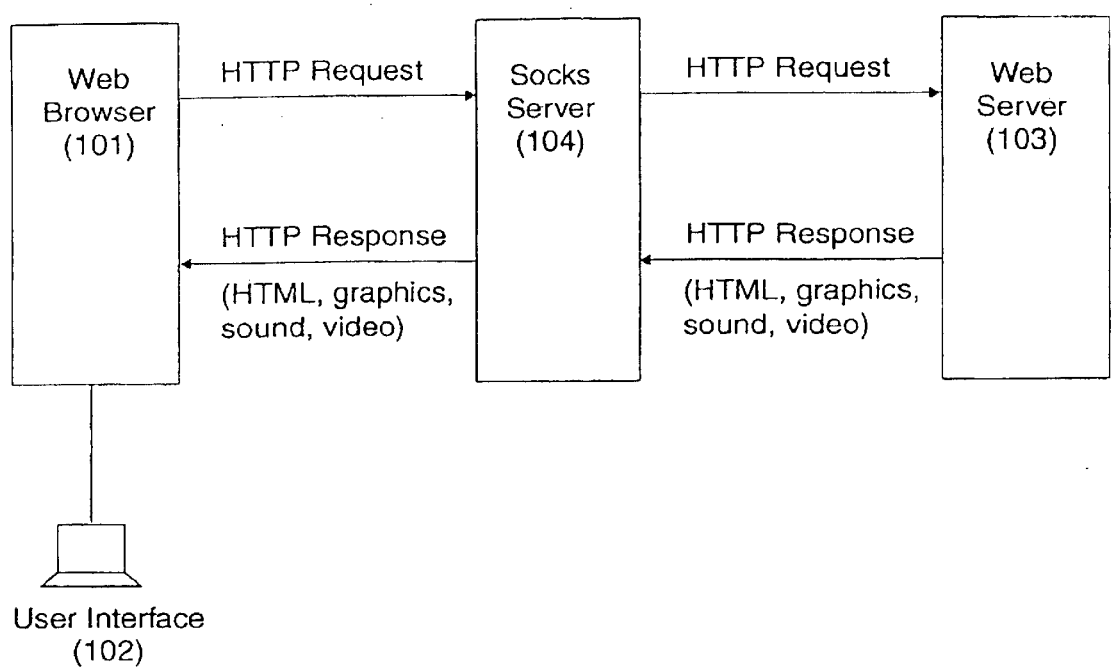
FIG. 1 is a logical view of an end user system accessing the World Wide Web, according to prior art.

FIG. 1 shows a user system with a user interface (102) comprising a Web Browser (101) for accessing the World-Wide-Web (WWW). The WWW content is transferred using the HTTP protocol. HTTP requests and responses are exchanged between the Web Browser program (101) and a destination Web Server (103) containing the WWW information the user wants to access. The Socks Server (104) between the Web Browser (101) and the Web Server (103) acts as an intermediary HTTP Relay forwarding the HTTP requests and responses to their destination. The Web Browser program (101) makes an HTTP request to the Socks Server (104) and the Socks Server forwards the request to the destination Web Server (103). The flow in the reverse direction (HTTP response) again goes via the Socks Server (104) to the Web Browser (101). In this way the Socks Server can limit the traffic to authorised transactions according to its configuration (based on some defined security and access control policy). The Socks Server hence protects the network where Web Browser is located.

Physical View

Figure 2:
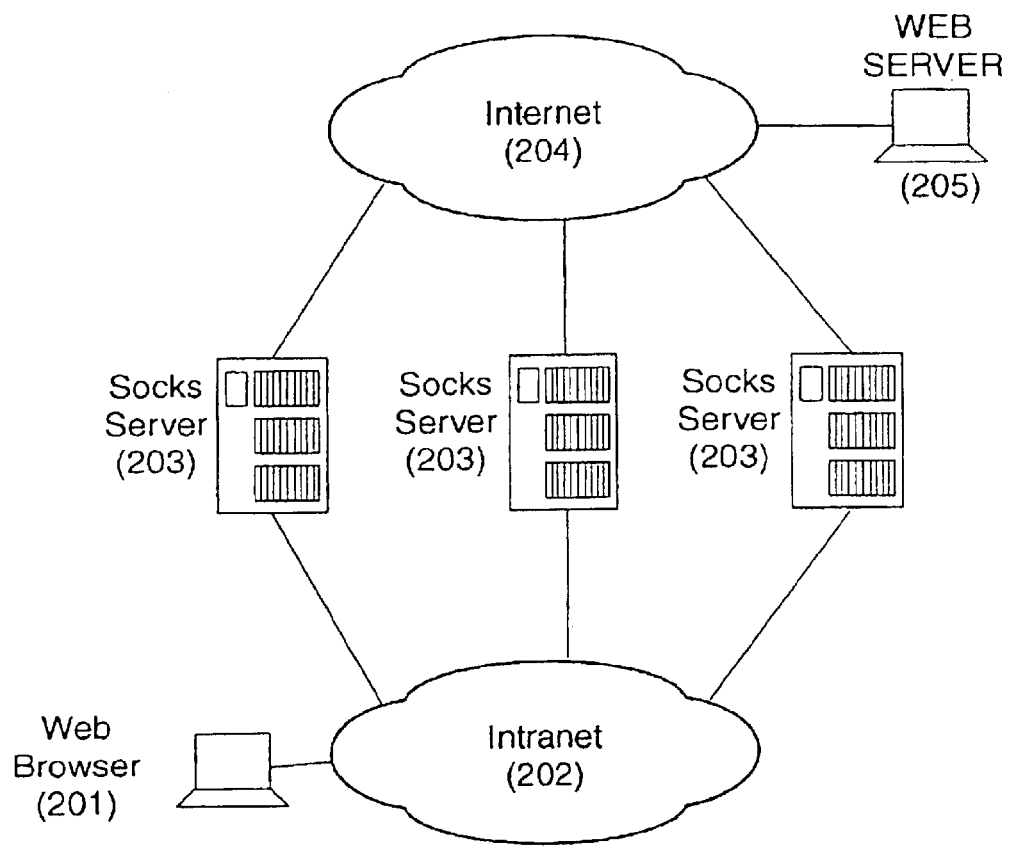
FIG. 2 is a general view of an end user system accessing the World Wide Web according to prior art.

FIG. 2 is a physical view of the set-up logically described in FIG. 1. In this particular example, the Web Browser (201) runs on a system (workstation) connected to an Intranet (202) network. The Socks Servers (203) protecting the Intranet connect both the (private) Intranet (202) and the (public) Internet (204), the destination Web Server (205) is also connected to the Internet. It is important to note that Socks Servers attach two networks and hence act as intermediaries for communications between said two networks. Multiple Socks Servers are often used in order to provide access robustness and load sharing.

IP Datagram

Figure 3:
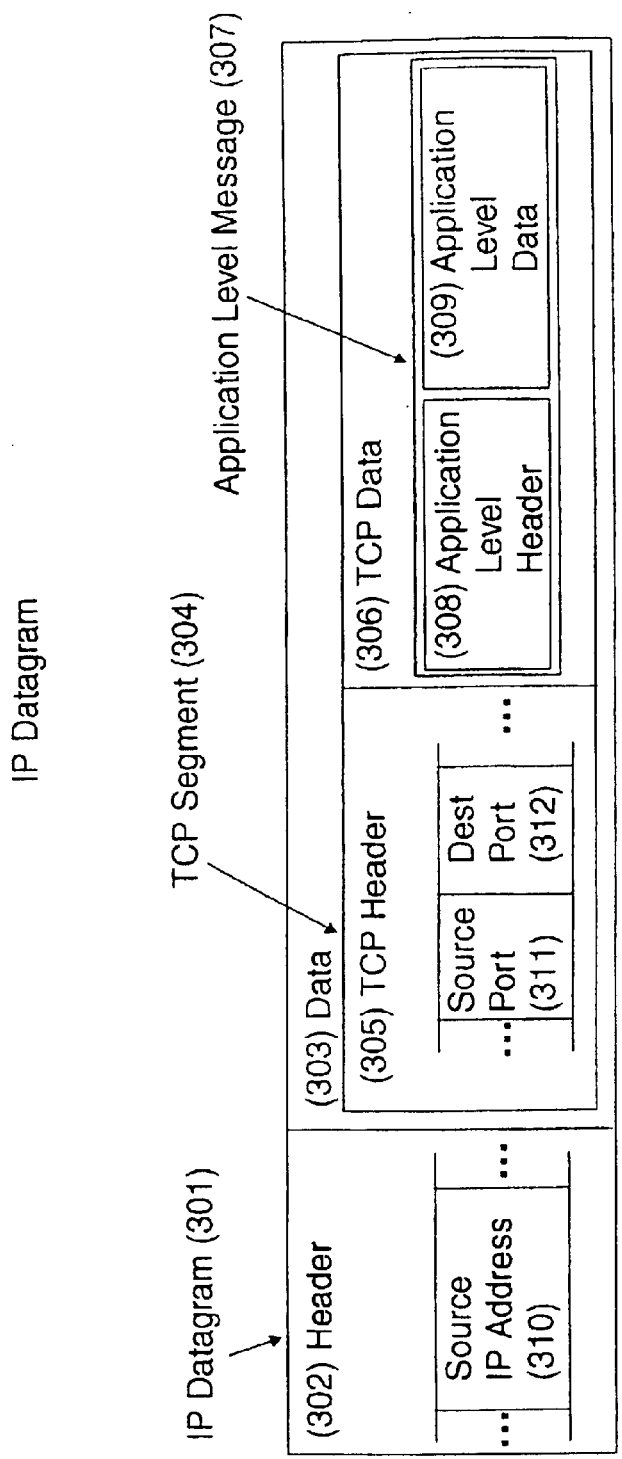
FIG. 3 shows an IP Datagram according to prior art.

The transfer unit of a data packet in TCP/IP is called an IP Datagram. It is made up of a header containing information for IP protocol and data that is only relevant to the higher level protocol. FIG. 3 shows the format of a IP Datagram, in the environment described in FIGS. 1 and 2:

(301) IP Datagram. An IP Datagram is a message exchanged between 2 computer systems across a TCP/IP network. An IP Datagram is divided in 2 parts:
a Header, and
Data.

(302) IP Datagram Header. The header comprises fields such as:
the Type Of Service (TOS) field (310),
the Source IP Address (the IP address of the computer (source) which sends the IP Datagram),
the Destination IP Address (the IP address of the computer which is the destination of the IP Datagram).
The IP Header is mainly used to route the IP Datagram to its final destination.

The Type Of Service (TOS) field (310) is an indication of the quality of service requested for the IP Datagram. It can be used to provide the nature and the priority of the IP Datagram. It can be set either by the system initiating the connection (the origin), or on the fly by a network device within the network.

(303) IP Datagram Data. This field comprises the data sent by the originator to the destination computer system. The destination computer system processes this data. Since the TCP/IP protocol suite is organized in layers, the IP Datagram field comprises the message relevant to the higher level protocol (which is TCP in the environment related to the invention).

(304) TCP Segment. A TCP message is usually called TCP Segment.

(305) TCP Header. A TCP Header comprises fields such as the Source Port and the Destination Port which identify the application protocol (e.g. HTTP, FTP, Telnet, Socks) transported by TCP. This field is mainly used by the destination of the IP Datagram to determine which application must process the data transported by TCP.

(306) TCP Data. The TCP Data field comprises application data which are sent by the originator (source) to the destination computer system. The destination computer system processes the data. Since the TCP/IP protocol suite is organized in layers, the TCP Data part contains the information relevant to the higher level protocol which is the Application level protocol (such as HTTP, FTP, Telnet, Socks).

(307) Application Level Message. The TCP Data part of the IP Datagram contains an Application Level Message. This is for example a Socks message (for instance a "CONNECT" or a "BIND" message), a HTTP message, a FTP message, or a Telnet message. Depending on the Application level protocol, this Application Level Message can also be split in 2 parts.

(308) Application Level Header. The Application Level Header is the header relevant to the application protocol such as HTTP, FTP, Telnet.

(309) Application Level Data. This is the data part which is processed by the application responsible of handling the Application Level protocol. This is usually the data which is directly relevant to the end user (for instance, data entered by an end user on his workstation).

Socks Client and Socks Server

Figure 4:
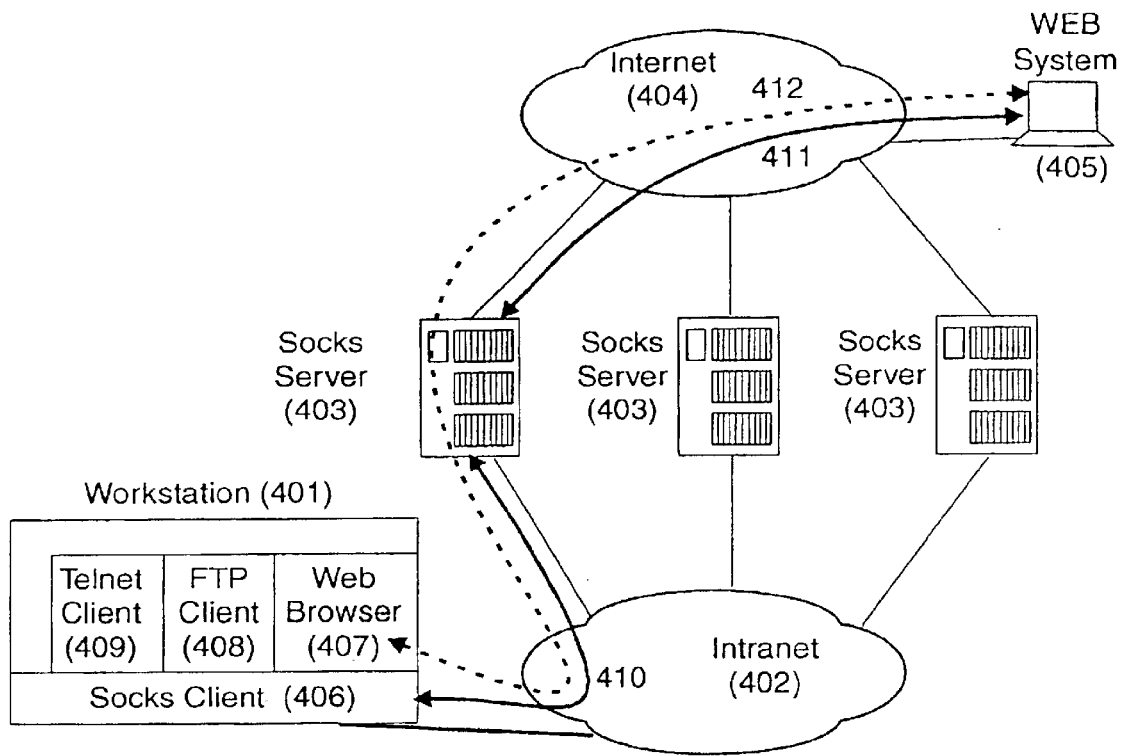
FIG. 4 is a general view of an end user system accessing the World Wide Web through Socks Servers according to prior art.

A Socks is a networking proxy protocol that allows client workstations to gain full access to hosts outside their local network while providing a high degree of security. FIG. 4 shows an end user workstation (401) connected to an Intranet (402). The Socks Servers (403) that protect the Intranet attach both the (private) Intranet (402) and the (public) Internet (404). The destination Web System (405) also connects the Internet (the Web System is for instance a WEB Browser, a FTP Server, or any system attached to the Internet that can be accessed from the Intranet).

The end user workstation (401) comprises a software program called Socks Client (406) for a secure access to the World-Wide-Web (WWW) via a Socks Server. The Socks protocol is independent of the Application Level protocol, and can therefore be used for instance for HTTP, FTP, or Telnet communications.

WEB applications running on an end user workstation (such as a WEB Browser (407), an FTP Client (408), or a Telnet Client (409)) use the services of a Socks Client (406) to gain access to an outside WEB System (405). The Socks Client located on the end user workstation sends (410) IP Datagrams to a Socks Server. The Socks Client creates some form of "virtual tunnel" between workstation and Socks Server. The Socks Server authenticates the user, authorizes the request, establishes a connection (411) with the outside WEB System, and then transparently forward application data between the end user workstation and the WEB System (412).

Socks Dispatcher System

Figure 5:
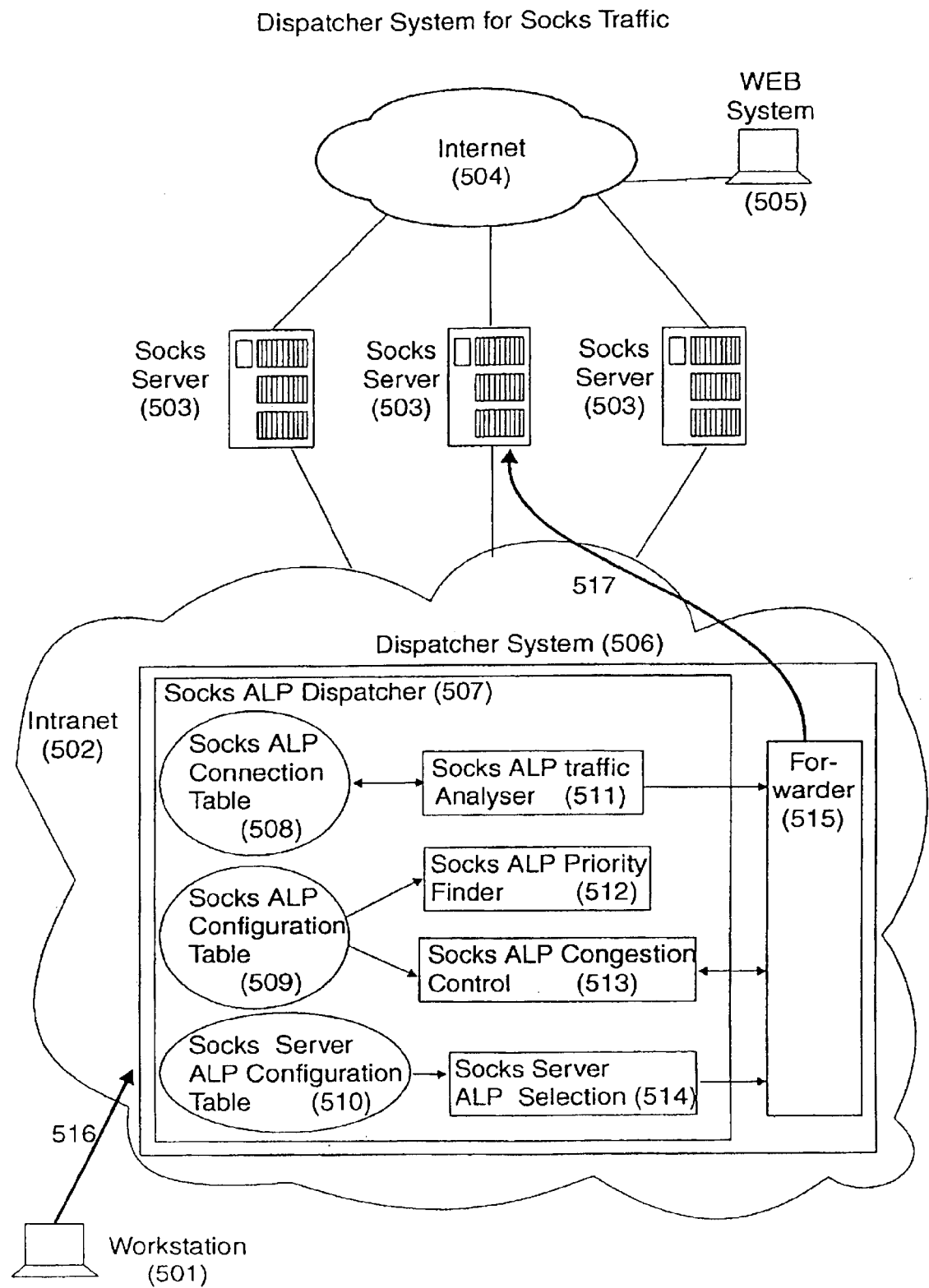
FIG. 5 shows a system for dispatching Socks traffic according to the present invention.

The present invention relates to a system and method for selecting the "best" Socks Server among a plurality of Socks Servers according to priority and Application Level protocol criteria to insure availability and response time to end users accessing the World Wide Web from their workstations. FIG. 5 is a view of a system for dispatching Socks traffic on Socks Servers (503) according to the present invention.

An end user workstation (501) comprising a Socks Client is connected to the Intranet (502). Multiple Socks Servers (503) are available to access the WEB System (505) connected to the Internet (504). The Dispatcher System (506) is located within the Intranet for dispatching Socks traffic over Socks Servers (503). According to the present invention, the system and method for dispatching the Socks traffic uses the Application Level Protocol (ALP) of IP Datagrams. Therefore, the function in charge of dispatching of Socks traffic within the Dispatcher System will be named "Socks ALP Dispatcher" (507). The Socks ALP Dispatcher (507) within the Dispatcher System (506) is configured with information concerning the Socks traffic (509) and Socks Servers (510).

The IP Datagram is sent (516) by the end user workstation (501) to the Dispatcher System (506). The IP Datagram is then forwarded to the Socks ALP Dispatcher (507). The Socks ALP Dispatcher then forwards it in sequence to its multiple components:

(511) a Socks ALP Traffic Analyzer component analyses the IP Datagram and determines its Application Level protocol by means of a Socks ALP Connection table (611).

(512) a Socks Priority Finder component determines the priority of the IP Datagram, based on its Application Level protocol and based on the characteristics of the traffic described in a Socks ALP Configuration table (601).

(513) a Socks ALP congestion Control component detects any congestion condition on the Dispatcher System, and, if required, discards traffic according to some Application Level protocol and priority criteria.

(514) a Socks Server ALP Selection component selects the best Socks Server for forwarding the IP Datagram, based on the characteristic of Socks Servers described in a Socks Server ALP Configuration table (606) and based on some priority and Application Level protocol criteria.

The Socks ALP Dispatcher ultimately forward the IP Datagram to a Forwarder (515) component within the Dispatcher System. This Forwarder component forwards (517) the IP Datagram to the selected Socks Server. Current products offer an IP Forwarder or a Dispatcher component, such as the IP Routing component implemented in any IP Router or such as the TCP Dispatcher component implemented in existing Dispatcher Systems. The invention is independent of the Forwarder component and does not surely on the way the IP Datagram is handled by this Forwarder component which can then for instance use forwarding mechanisms either based on the IP address or on the MAC (Medium Access Control) address of the Socks Server.

Internal Tables of the Socks ALP

Figure 6:
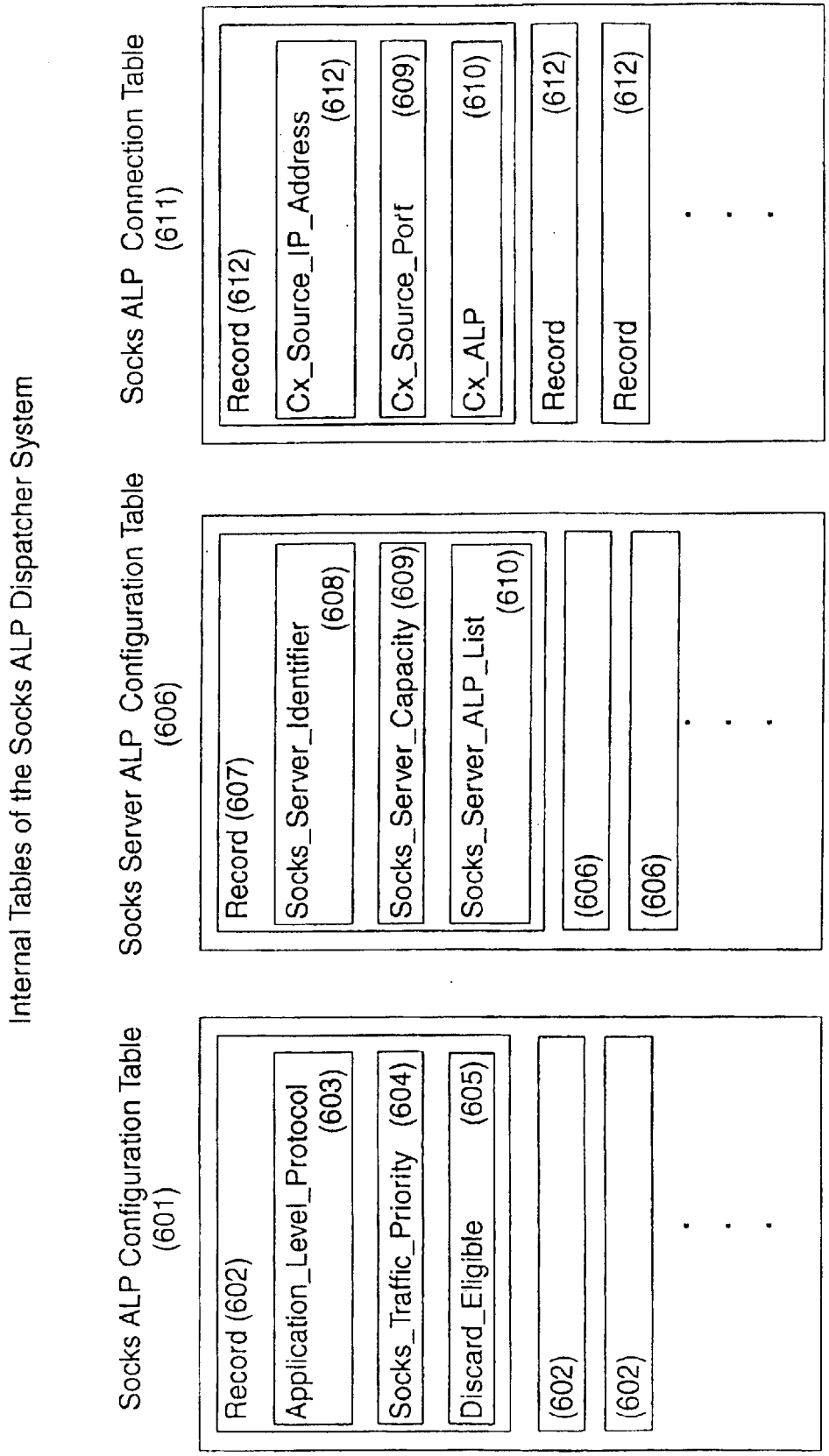
FIG. 6 shows the internal tables used by the Socks ALP Dispatcher according to the present invention.

FIG. 6 depicts the different tables located on the Dispatcher System. These tables are used by the various components of the Socks ALP Dispatcher for the Socks ALP traffic analysis, the priority determination, the congestion control, and the Socks Server selection.

Two configuration tables are used by the Socks ALP Dispatcher on the Dispatcher System. These two configuration tables must be created (for instance by a Network Administrator) before starting the Socks ALP Dispatcher.

(601) Socks ALP Configuration Table. This table comprises for each Application Level Protocol, a traffic priority and an indication concerning the discard eligibility of the traffic.

(606) Socks Server ALP Configuration Table. This table comprises for each Socks Server, the capacity of the Socks Server and a list of the Application Level protocols that the Socks Server can process.

One table is dynamically built and used by the Socks ALP Dispatcher for internal purpose:

(611) Socks ALP Connection table. This table comprises the originator and the Application Level Protocol of each Socks connection.

These three internal table are detailed in FIG. 6.

Socks ALP Configuration Table

The Socks ALP Configuration table (601) (a flat file in a preferred embodiment) is created by the Network Administrator in charge of the Intranet. This table associates each Application Level Protocol with a traffic priority and an indication concerning the discard eligibility of the traffic. The table contains a list of records (602), each record comprising the following information:

(603) Application_Level_Protocol (also referred to as ALP). There is one value for each Application Level protocol. Typically, a record is defined for each of the main WWW protocols including Gopher, HTTP, FTP, Telnet, SSL (this is Secure HTTP).

(604) Socks_Traffic_Priority (also referred to as STP). This is the priority of IP datagrams associated with the Application Level Protocol (603). For instance, FTP is generally associated with a minimum priority, while HTTP is generally associated with a maximum priority.

(605) Discard_Eligible. This is an indication for discarding IP datagrams comprising socks traffic. This information associated with the Application_Level_Protocol (603) indicates whether IP datagrams can be discarded or not in case of congestion. The possible values as "Yes" and "No". In heavy congestion conditions, IP datagram with Discard_Eligible="Yes" is discarded first. IP datagram with Discard_Eligible="No" may also be discarded if required. Typically, FTP is defined with Discard_Eligible="Yes" and HTTP is defined with Discard_Eligible="No". Thus the FTP traffic is discarded first in case of congestion.

The Socks ALP Configuration table also comprises one default record with default values (Socks_Traffic_Priority and Discard_Eligible default values). These default values are used when the ALP value is not explicitly defined in a record of the table.

Socks Server ALP Configuration

The Socks Server ALP Configuration (606) (a flat file in a preferred embodiment) is created by the Network Administrator in charge of the Intranet. This table comprises for each Socks Server (607), the capacity of the Sock Server and a list of the Application Level protocols that the Socks Server can process. Each record (607) comprises the following information:

(608) Socks_Server_identifier. This is the address of the Socks. This is for instance the IP Address or the MAC (Medium Access Control) address of the Socks Server.

(609) Socks Server Capacity. This is the capacity of the Socks Server. Typically, a very powerful Socks Server has a high capacity. For instance, more Socks traffic can be dispatched on a Socks Server with a Capacity of 15 than on a Sock Server with a Capacity of 0. High priority Socks traffic is preferably dispatched on high capacity Socks Servers.

(610) Socks_Server_Application_Level_Protocol_List (also referred to as Socks_Server_ALP_List). This is a list of the Application Level protocols that can be handled by the Socks Server. For instance, a Socks Server with a low capacity can be configured to only handle FTP, while a more powerful Socks Server can be configured to handle all Application Level protocols. A default value "ALL" indicates that the Socks Server is capable of handling any Application Level protocol.

Socks LP Connection Table

The Socks LP Connection table (611) is an internal table built and used by the Socks ALP Traffic Analyzer component to store the originator and the Application Level Protocol of each Socks connection. The table contains a list of records (612), each record providing the following information:

(613) Cx_Source_IP_Address. This is the IP address of the system which originates the Socks connection (this system is called "originator").

(614) Cx_Source_Port. This is the number of the Port identifying the program running on the originator system and which originates the Socks connection. The combination of Cx_Source_IP_Address and Cx_Source_Port identifies in a unique way the origin of a Socks connection.

(615) Cx_ALP. This is the Application Level Protocol transported by the Socks connection originated from the origin program uniquely identified by Cx_Source_IP_Address (613) and Cx_Source_Port (614).

Socks Alp Traffic Analyzer

Figure 7:
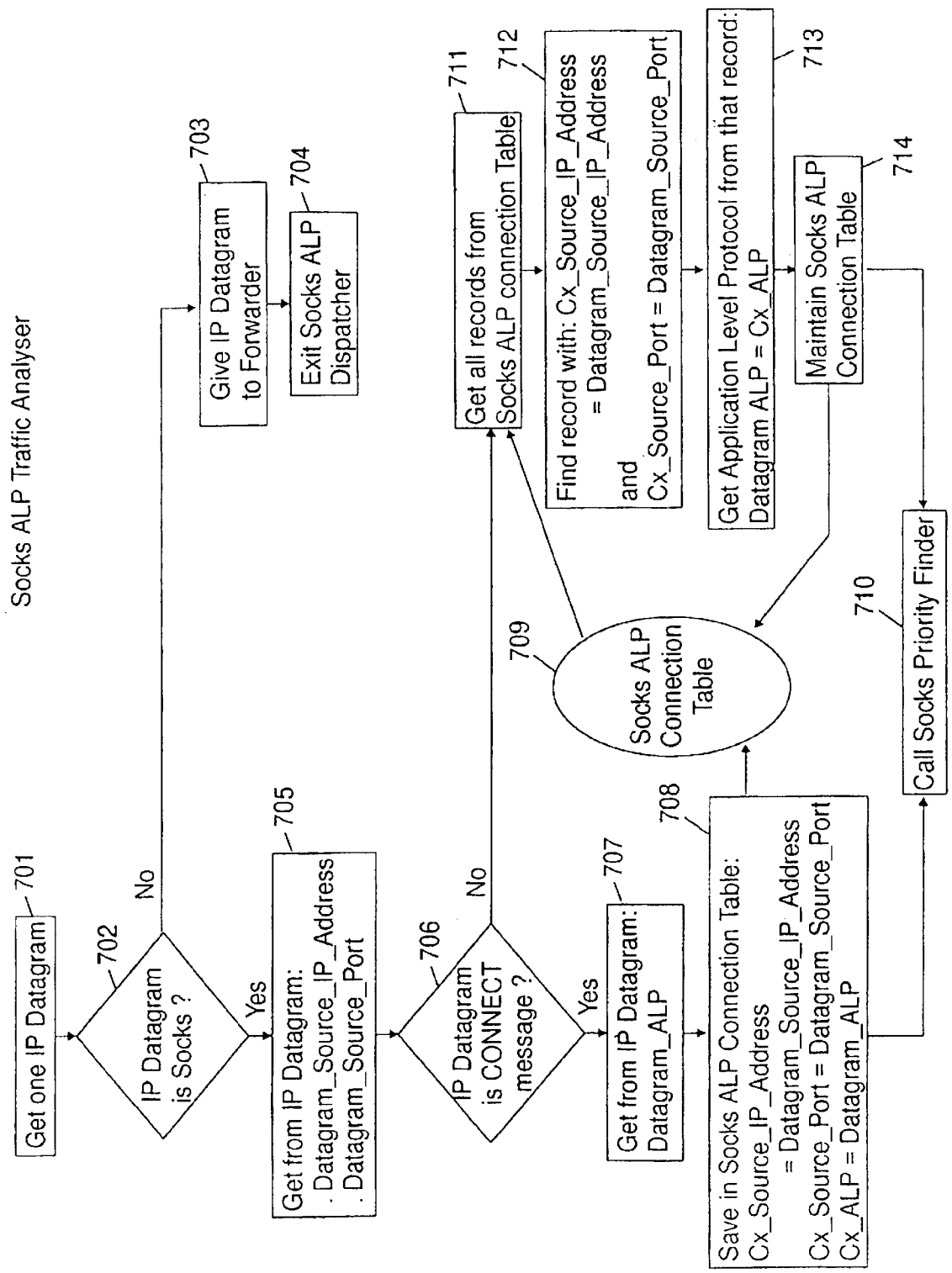
FIG. 7 is a flow chart of the Socks ALP Traffic Analyzer in the Dispatcher System According to the present invention.

The Socks ALP Traffic Analyzer component of the Socks ALP Dispatcher is a program running on the Dispatcher System. This component is in charge of determining the Application Level protocol of IP Datagrams received by the Dispatcher System. FIG. 7 is a flow chart which refers to the internal logic of the Socks ALP Traffic Analyzer component. This component:

(701) retrieves an IP Datagram.

(702) tests whether the IP Datagram transports Socks traffic or not. The test preferably uses the Destination Port field of the TCP Header comprised in the Data part of the IP Datagram. The Destination Port is compared to the Port that uses the Socks protocol (by default, the Port used by Socks is 1080). For instance, the Port used by the Socks protocol can be a configuration parameter of the Socks ALP Dispatcher. If the Destination Port in the TCP Header is equal to the Port used by Socks, then the IP Datagram transports Socks traffic, otherwise the IP Datagram does not transports Socks traffic and does not need to be processed by the Socks ALP Dispatcher.

If the IP Datagram does not transport Socks traffic:

(703) the Socks ALP Dispatcher is not involved in the dispatching of non Socks traffic. The IP Datagram is directly forwarded to the Forwarder component of the Dispatcher System.

(704) The processing by the Socks ALP Dispatcher of the IP Datagram is completed. The Socks ALP Dispatcher waits for the next IP Datagram.

If the IP Datagram does transport Socks traffic:

(705) identifies the originator of the IP Datagram from the IP Header and TCP Header:

Datagram_Source_IP_Address=Source IP Address field (in IP Header).

Datagram_Source_Port=Source Port field (in TCP Header)

(706) checks if the IP Datagram is a Socks CONNECT message. A Socks CONNECT message is identified by the CD field in the Application Level message (CD=1).

If the IP Datagram is a Socks CONNECT message:

(707) determines from the IP Datagram (in the Destport field of the Socks CONNECT message), the Application Level protocol (ALP) transported by the Socks connection:

Datagram_ALP=Destport field (in Socks CONNECT message)

(708) saves in a new record within the Socks ALP Connection table (709) the information retrieved from the Socks CONNECT message:

Cx_Source_IP_Address=Datagram_Source_IP_Address

Cx_Source_Port=Datagram_Source_Port

Cx_ALP=Datagram_ALP (710) calls the Socks Priority Finder component

If the IP Datagram is a not a Socks CONNECT message:

The IP Datagram therefore belongs to a Socks connection which is already established. This means that a CONNECT message has already been received and the corresponding record has been created in the Socks ALP Connection table. The Application Level Protocol (ALP) for that IP Datagram is then retrieved:

(711) gets all records from the Socks ALP Connection table.

(712) finds the record which corresponds to the Socks connection. This record is identified by (both conditions):

Cx_Source_IP_Address=Datagram_Source_IP_Address

Cx_Source_Port=Datagram_Source_Port (713) gets the Application Level protocol (ALP) of the IP Datagram from that record:

Datagram_ALP=Cx_ALP (714) removes from the Socks ALP Connection table (709) records of closed Socks connections (terminated connections). Closed Socks connections are detected for instance using the FIN and ACK indications in the TCP Header. Optionally, a Socks connection is considered closed after a certain period of time without IP Datagram on that Socks connection (this timer value can be for instance a configuration parameter of the Socks ALP Dispatcher). Any other existing algorithm to detect closed or half closed (for instance when one extremity of the connection has abnormally terminated) TCP connections can also be used to remove such connections from the table.

(710) calls the Socks Priority Finder component.

Socks Priority Finder

Figure 8:
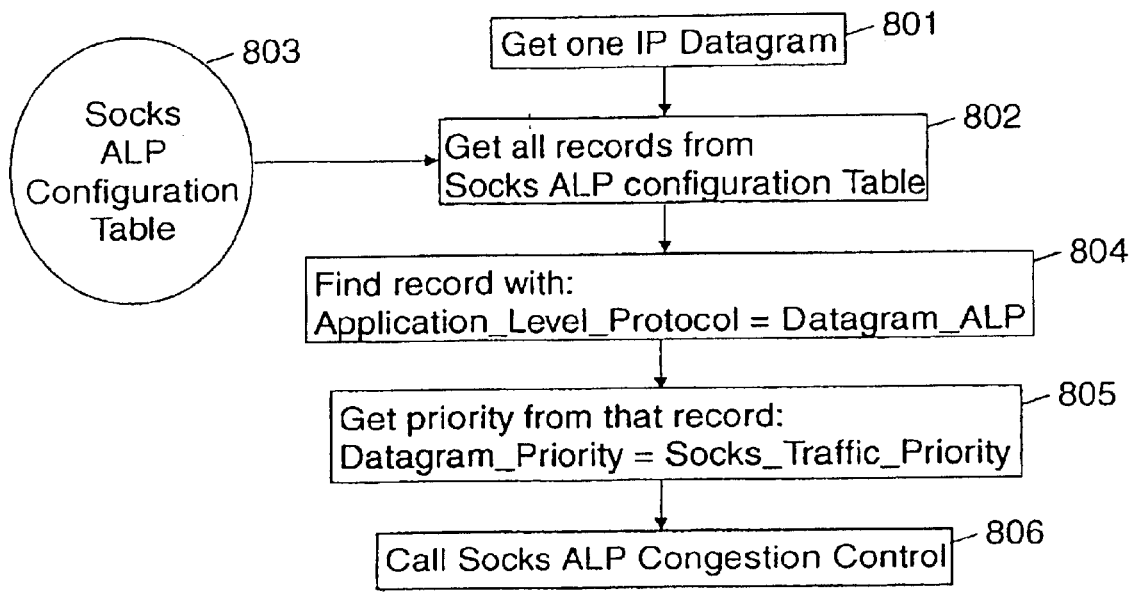
FIG. 8 is a flow chart of the Socks Priority Finder in the Dispatcher System according to the present invention.

The Socks Priority Finder component of the Socks ALP Dispatcher is a program running on the Dispatcher System. This component determines the priority of the received IP Datagram, based on its Application Level protocol and based on the Socks ALP Configuration table. The FIG. 8 is a flow chart which refers to the internal logic of the Socks Priority Finder component. This component:

(801) gets the IP Datagram forwarded by the Socks ALP Traffic Analyzer component (along with its Datagram_ALP).

(802) retrieves all records from the Socks ALP Configuration table (803). The table is preferably read only once for all and cached by the Socks Priority Finder at configuration time, in order to minimize the impact on performances.

(804) finds the record corresponding to the Application Level protocol (ALP) of the IP Datagram. This is the record with:

Application_Level_Protocol=Datagram_ALP (805) determines from that record the priority of the IP Datagram:

Datagram_Priority Socks_Traffic_Priority (806) calls the Socks ALP Congestion Control component.

Socks Alp Congestion Control

The Socks ALP Congestion Control component of the Socks ALP Dispatcher is a program running on the Dispatcher System. When the Dispatcher System is congested, this component determines the list of IP Datagrams that are not yet sent and which must be discarded, according to multiple criteria:

The Application Level Protocol of the IP Datagram, as determined by the Socks ALP Traffic analyzer component.

The Priority of the IP Datagram, as determined by the Socks Priority Finder component.

Figure 9:
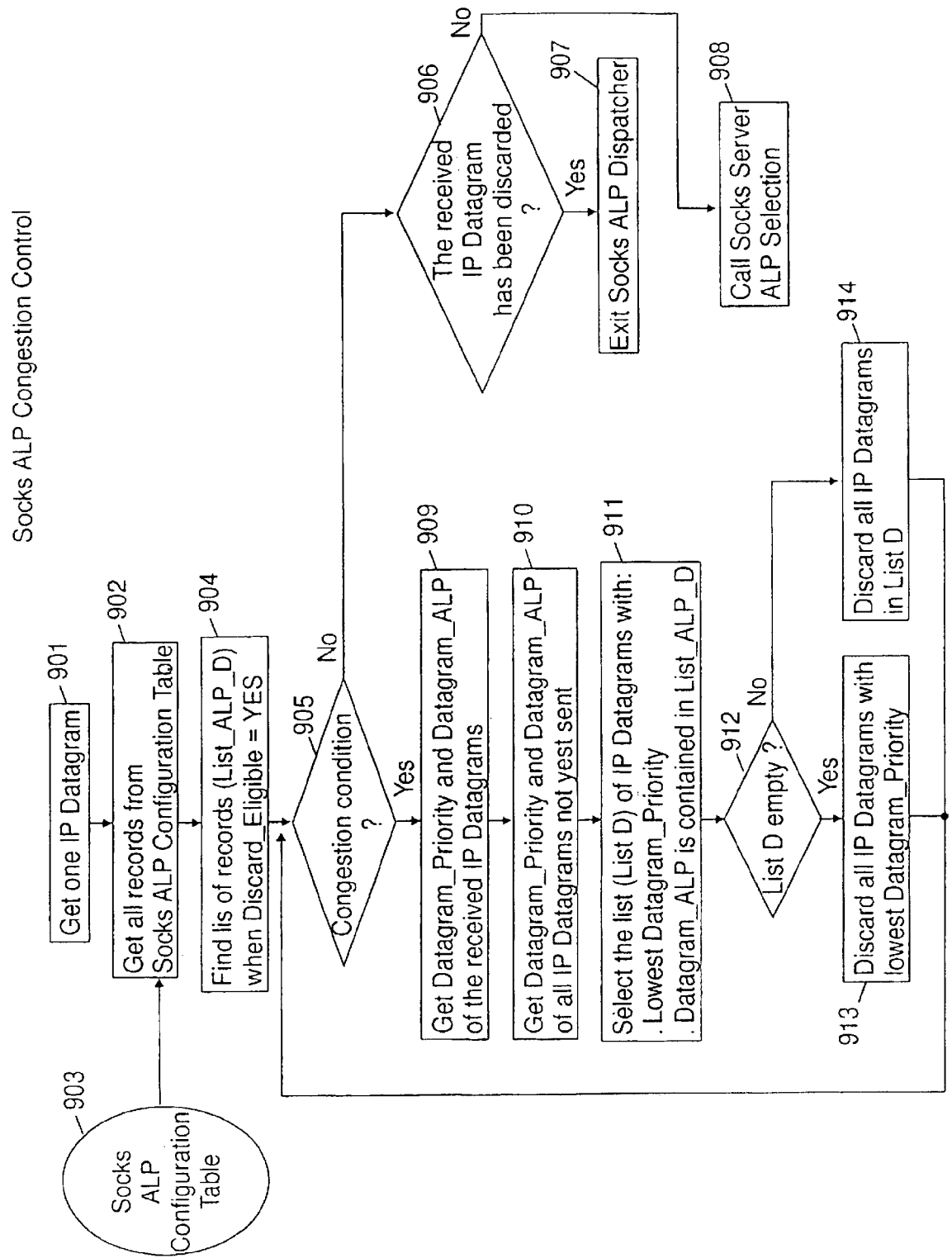
FIG. 9 is a flow chart of the Socks ALP Congestion Control in the Dispatcher System according to the present invention.

FIG. 9 is a flow chart which refers to the internal logic of the Socks ALP Congestion Control component. This component:

(901) gets the IP Datagram forwarded by the Socks ALP Traffic Analyzer component (along with its Datagram_ALP which has been determined by the Socks ALP Traffic Analyzer component, and the Datagram Priority which has been determined by the Socks Priority Finder component).

(902) retrieves all records from the Socks ALP Configuration table (903). This table is preferably read only once for all and cached by the Socks ALP Congestion Control program when it starts, in order to minimize any impact on performances.

(904) scans all records of the Socks ALP Configuration table to find all the records with Discard_Eligible="Yes". This list (called List_ALP_D) comprises the Application Level Protocols which must be discarded first.

(905) determines whether the Dispatcher System is congested or not. This can be done for instance by interfacing the Forwarder component and by checking whether the output queues are full or not.

If there is no congestion:

(906) Checks whether the IP Datagram received by the Socks ALP Congestion Control has been discarded or not:

(908) if the IP Datagram has not been discarded, forwards the IP Datagram to the Socks Server ALP Selection component.

(907) if the IP Datagram has been discarded, exits the Socks ALP Dispatcher and waits for the next IP Datagram to process.

If there is a congestion:

(909) gets the Datagram_Priority and the Datagram_ALP of the IP Datagram received by the Socks ALP Congestion Control.

(910) gets the Datagram_Priority and the Datagram_ALP of all IP Datagrams which have not yet been sent. For instance, all such IP Datagrams can be found by interfacing the Forwarder component and by checking all output queues. The Datagram_Priority and the Datagram_ALP of each of these IP Datagrams is preferably stored by the Forwarder along with the IP Datagram, and can then be directly retrieved. If the Datagram_Priority and the Datagram_ALP of each of these IP Datagrams has not been stored, it can be determined using the Socks Traffic Configuration table as already done by the Socks ALP Traffic Analyzer and the Socks Priority Finder components.

(911) select the list (ListD) of all IP Datagrams with an Application Level Protocol which should be discarded first and with the lowest priority. Such IP Datagram must satisfy both conditions:

Datagram_ALP is contained in List_ALP_D lowest Datagram_Priority.

(912) tests if ListD is empty.

If ListD is not empty:

(914) discards all IP Datagrams in ListD. IP Datagrams which are not in ListD are not discarded and the Socks ALP Congestion Control component will attempt to send them. For instance, Gopher protocol can be defined in the Socks ALP Configuration table with the lowest priority and Discard_Eligible="Yes", FTP protocol traffic can be defined with the lowest priority and Discard Eligible="No", Interactive Telnet traffic can be defined with the highest priority and with Discard_Eligible="yes".

HTTP traffic can be defined with the highest priority and with Discard_Eligible="No".

This way, in case of congestion, the Gopher traffic will be discarded first, then Telnet, and FTP. The last one to be discarded (if still required) will be HTTP.

Thus, the HTTP service availability will be higher than the Gopher, Telnet, and FTP service availability.

After ListD has been discarded, the Socks ALP Congestion Control loops to check if there is still a situation of congestion (905). The selection and discard steps are repeated until there is no more congestion.

If ListD is empty:

(913) discards IP Datagrams with the lowest Datagram_Priority. The IP Datagrams with the highest priorities can be sent. The Socks ALP Congestion Control loops to check if there is still a congestion situation (905). The selection and discard steps are repeated until there is no more congestion condition.

Socks Server ALP Selection

The Socks Server ALP Selection component of the Socks ALP Dispatcher is a program running on the Dispatcher System. This component selects a Socks Server among the plurality of Socks Servers to forward the IP Datagram. The Socks Server is selected according to multiple criteria:

The Application Level Protocol of the IP Datagram, as determined by the Socks ALP Traffic Analyzer component, The Priority of the IP Datagram, as determined by the Socks Priority Finder component.

Some Socks Server characteristics:

The Socks Server Capacity,

The List of Application Level Protocols that can handle the Socks Server.

The criteria used by the Socks Server ALP Selection component are fully compatible and can co-exist with other existing criteria such as Socks Server dynamic load. Such other selection criteria can be added to the criteria used by the present invention.

Figure 10:
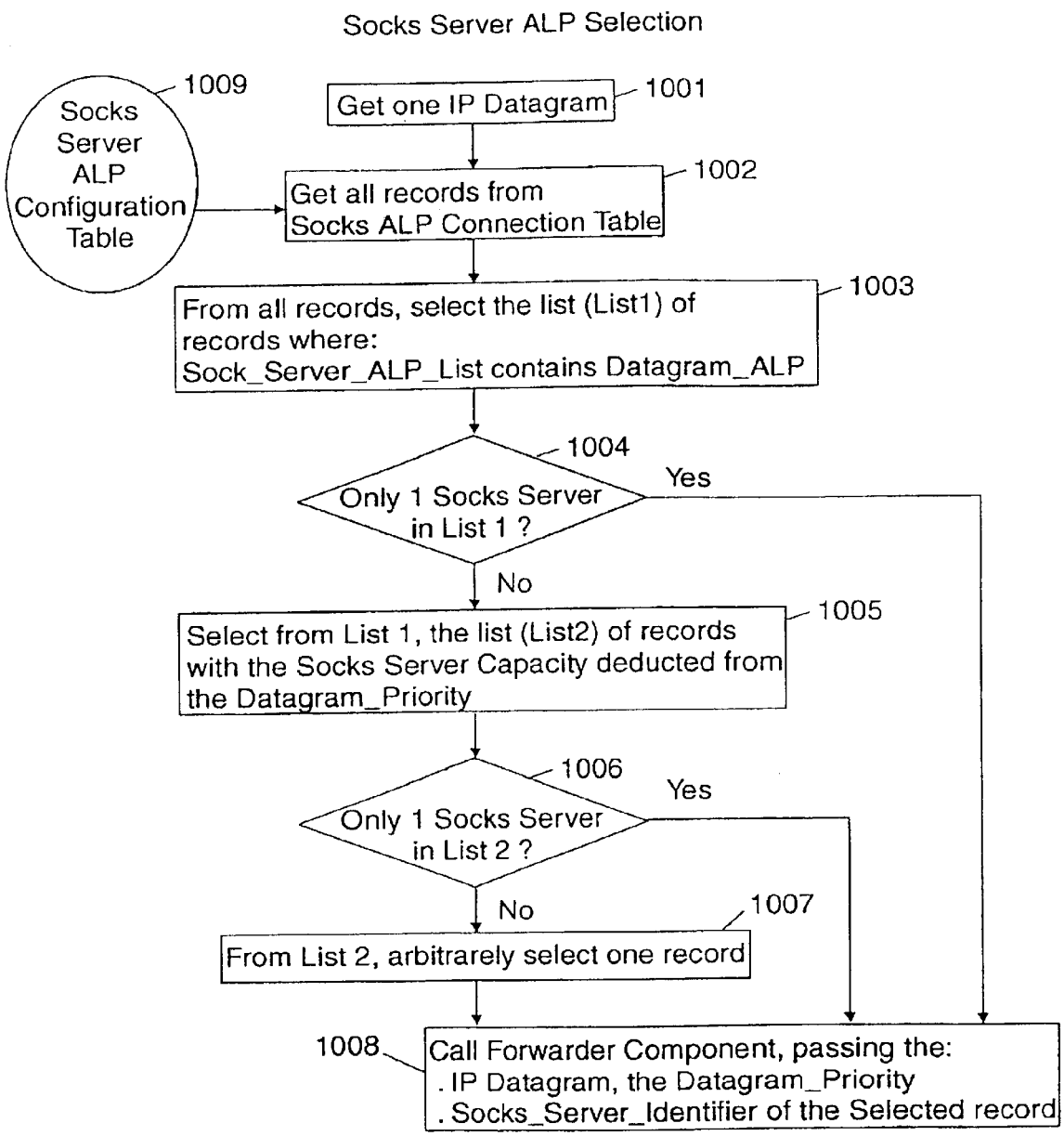
FIG. 10 is a flow chart of the Socks Server ALP Selection in the Dispatcher System according to the present invention.

FIG. 10 is a flow chart which refers to the internal logic of the Socks Server ALP Selection component. This component:

(1001) retrieves an IP Datagram forwarded by the Socks ALP Congestion Control component.

(1002) retrieves all records from the Socks Server ALP Configuration table (1009). The table is preferably read only once for all and cached by the Socks Server ALP Selection program when it starts, in order to minimize any impact on performances.

(1003) scans all the records (Socks Servers) in the Socks Server ALP Configuration table to find all the Socks Servers capable of handling the IP Datagram (and which are then candidate for the Socks Server selection). This Socks Servers list (called List1) is such that the Socks Server ALP List of each Socks Server of the list comprises the Datagram_ALP (the Application Level Protocol of the received IP Datagram, as determined by the Socks ALP Traffic Analyzer).

(1004) Tests the number of records in List1:

If no record is found, this means that no Socks Server has been defined for that traffic, and therefore the IP Datagram is discarded and the Socks ALP Dispatcher exits.

If List1 contains one record, the Socks Server defined for this record is selected. The Socks Server Identifier is retrieved from this record.

(1008) forwards the IP Datagram to the Forwarder component, with the Socks Server Identifier and the Datagram_Priority. The Forwarder then sends the IP Datagram to the selected Socks Server. The Socks ALP Dispatcher exits and waits for the next IP Datagram.

If List1 contains more than one record (Socks Server), this means that more than one Socks Server can handle the IP Datagram. Additional selection criteria must then be used:

(1005) retrieves from List1 all records (Socks Servers) with a specific capacity (609). This specific capacity is determined using the Datagram_Priority (priority of the IP Datagram as determined by the Socks Priority Finder component). This second list of records (Socks Servers) is called List2. The relationship between capacity and priority can be defined for instance in a table accessed by the Socks Server ALP Selection component. For instance, an IP Datagram with a high Datagram_Priority will be forwarded to a high capacity Socks Server in order optimize the service provided to high priority Socks traffic.

(1006) Tests the number of records in List2:

If List2 contains one record, the Socks Server defined for this record is selected. The Socks_Server_Identifier is extracted from this record.

(1008) forwards the IP Datagram to the Forwarder component, with the Socks Server Identifier. The Forwarder then sends the IP Datagram to the selected Socks Server. The Socks ALP Dispatcher exits and waits for the next IP Datagram.

If List2 contains more than one record, this means that more than one Socks Server can handle the IP Datagram. Final selection criteria must then be used:

(1007) selects one record in List2. This record is arbitrarily selected or is selected using any simple round robin algorithm (one record is selected this time, and next time a different one will be selected).

The Socks Server defined for this record is selected. The Socks_Server_Identifier is extracted from this record.

(1008) forwards the IP Datagram to the Forwarder component, with the Socks_Server_Identifier and the Datagram_Priority. The Forwarder then sends the IP Datagram to the selected Socks Server. The Socks ALP Dispatcher exits and waits for the next IP Datagram.

Advantages

The present inventions provides the following advantages:

The integration of a priority criteria for dispatching Socks traffic optimizes the Web service performances. For instance, a high priority Socks traffic (for instance HTTP traffic) can be dispatched to a Socks Server having a high capacity while a low priority Socks traffic can be dispatched to a Socks Server having a low capacity.

The integration of an Application Level protocol criteria for dispatching Socks traffic allows the use of differently configured Socks Servers (for capacity reason). For instance, a Socks Server with a high capacity can be configured to process all types of Application Level protocols, while a Socks Server with a poor capacity can be configured to process only FTP. Socks traffic can then be dispatched to either one or another Socks Server according to the Application Level protocol.

The integration of an Application Level protocol criteria for dispatching Socks traffic optimizes the Web service performances. For instance, Socks traffic comprising HTTP traffic can be dispatched to a high capacity Socks Server while Socks traffic comprising batch FTP traffic can be dispatched to a low capacity Socks Server.

Since the dispatching process does not use the Type Of Service field of the IP Datagram Header, the invention can be used without being dependent of existing workstations or network devices within the Intranet. For instance, the invention can be used to provide optimized Socks dispatching within an existing Intranet where the TOS field cannot be set nor used.

Since the dispatching process does not use the TOS field, the invention does not presume the possible values of the TOS field set by the workstation or network device within the Intranet.

The Integration of a priority criteria for discarding Socks traffic in case of congestion contributes to the Web service availability. A low priority Socks traffic can be discarded by a congested Dispatcher System. The high priority Socks traffic can then be normally dispatched instead of being arbitrarily discarded. This process ensures a service continuity to this high priority traffic.

The Integration of an Application Level protocol criteria for discarding Socks traffic in case of congestion contributes to the Web service availability. For instance, a low priority Socks traffic comprising batch FTP traffic can be discarded by a congested Dispatcher System. Interactive Socks traffic such as Telnet can then be normally dispatched instead of being arbitrarily discarded. This process ensures a service continuity to this Telnet traffic.

While the invention has been particularly shown and described with reference to a preferred embodiment, it will be understood that various changes in form and detail may be made therein without departing from the spirit, and scope of the invention.

What is claimed is:

1. A method of dispatching on a socks server an IP datagram originated from an application on a source device, in an Internet Protocol (IP) network comprising a plurality of socks servers, said IP datagram comprising a Source IP Address field in an IP header, a Source Port field in a Transmission Control Protocol (TCP) header, and socks data, said method comprising the steps of:

in a socks dispatcher,
identifying the source device, said step comprising the further step of retrieving source address in the Source IP Address field;
identifying the application on the source device, said step comprising the further step of retrieving an application address in the Source Port field;
determining an application level protocol of socks data by referring to a first table, said first table comprising, for each socks connection identified by a source address and an application address, an application level protocol by:
determining that the IP datagram comprises a socks CONNECT message;
updating the first table with a new socks connection identified by the source address and the application address of the IP datagram;
retrieving the application level protocol from the IP datagram;
associating said socks connection with said retrieved application level protocol in said first table; and
selecting a socks server by referring to a second table, said second table defining for each application level protocol one or a plurality of socks servers.

2. The method according to claim 1 wherein said IP datagram is sent with a given priority, and wherein said step of determining the application level protocol is followed by the further step of:
determining the priority of the IP datagram by referring to a third table, said third table defining a priority for each value of the application level protocol.

3. The method according to claim 2 wherein in case of congestion in one or a plurality of output queues, said step of determining the priority of the IP datagram is followed by the further steps of:
discarding in said one or plurality of output queues IP datagrams having the lowest priority until there is no more congestion; and
discarding the IP datagram when said IP datagram compared with IP datagrams in said one or plurality of output queues, has the lowest priority.

4. The method according to claim 2 wherein in case of congestion in one or a plurality of output queues, said step of determining the priority of the IP datagram comprises the further steps of:
selecting in said one or plurality of output queues, IP datagrams that can be discarded by referring to the third table, said table defining for each application level protocol an indication concerning the capacity of IP datagrams to be discarded or not in case of congestion;
discarding selected IP datagrams having the lowest priority until there is no more congestion; and
discarding the IP datagram when said IP datagram compared with IP datagrams in said one or plurality of output queues, can be discarded referring to said third table and has the lowest priority.

5. The method according to claim 2 wherein said third table comprises for each application level protocol:
a value corresponding to the application level protocol;
a priority; and
an indication concerning the capacity of IP datagrams to be discarded or not in case of congestion.

6. The method according to claim 3 comprising the initial steps of:
configuring said second and third tables,
defining a default socks server for application level protocols not defined in the second table; and
defining a default priority and optionally a default indication concerning the capacity of IP datagrams to be discarded or not in case of congestion, for application level protocols not defined in the third table.

7. The method according to claim 1 wherein said first table is dynamic and comprises for each socks connection:
a source address identifying the source device;
an application address identifying the source application; and
application level protocol for the socks connection.

8. The method according to claim 1 wherein said second table comprises for each sock server:
an address identifier;
a sock server capacity; and
application level protocols supported by the socks server.

9. The method according to claim 1 wherein the step of selecting a socks server referring to a second table, comprises the further steps of:
determining the number of socks servers in the second table defined for the application level protocol of the IP datagram:
if only one socks server is defined in the second table, forwarding the IP datagram to said socks server,
if more that one socks server is defined in the second table, forwarding the IP datagram to a socks server selected according to its capacity and a priority of the IP datagram.

10. A socks dispatcher for dispatching on a socks server an IP datagram originated from an application on a source device, in an Internet protocol (IP) network comprising a plurality of socks servers, said IP datagram comprising a Source IP Address field in an IP header, a Source Port field in a Transmission Control Protocol (TCP) header, and socks data, said socks dispatcher comprising:
means for identifying the source device, said means including means for retrieving a source address in the Source IP Address field;
means for identifying the application on the source device, said means including means for retrieving the application address in the Source Port field;
means for determining an application level protocol of socks data by referring to a first table, said first table comprising, for each socks connection identified by a source address and an application address, an application level protocol; including
means for determining that the IP datagram comprises a socks CONNECT message;

means for updating the first table with a new socks connection identified by the source address and the application address of the IP datagram;

means for retrieving the application level protocol from the IP datagram;

means for associating said socks connection with said retrieved application level protocol in said first table and;

means for selecting a socks server by referring to a second table, said second table defining for each application level protocol one or a plurality of socks servers.

11. A computer program product for dispatching on a socks server an IP datagram originated from an application on a source device, in an Internet protocol (IP) network comprising a plurality of socks servers, said IP datagram comprising a Source IP Address field in an IP header, a Source Port field in a Transmission Control Protocol (TCP) header, and socks data, said computer program product comprising:

a computer readable media;

instruction means embodied within said computer readable media for identifying the source device, said instruction means including instructions for retrieving a source address in the Source IP Address field;

instructions means embodied within said computer readable media for identifying the application on the source device, said instruction means including instructions for retrieving the application address in the Source Port field;

instructions means embodied within said computer readable media for determining an application level protocol of socks data by referring to a first table, said first table comprising, for each socks connection identified by a source address and an application address, an application level protocol including:

instructions means for determining that the IP datagram comprises a socks CONNECT message;

instructions means for updating the first table with a new socks connection identified by the source address and the application address of the IP datagram;

instructions means for retrieving the application level protocol from the IP datagram;

instructions means for associating said socks connection % with said retrieved application level protocol in said first table; and instruction means embodied within said computer readable media for selecting a socks server by referring to a second table, said second table defining for each application level protocol one or a plurality of socks servers.

* * * * *